United States Patent [19]

Ford

[11] Patent Number: 5,118,309
[45] Date of Patent: Jun. 2, 1992

[54] MINIMUM WIRE INTERFACE FOR MULTIPLE ACCESSORIES

[75] Inventor: Robert B. Ford, Tamarac, Fla.

[73] Assignee: Motorola, Inc., Schaumburg, Ill.

[21] Appl. No.: 678,414

[22] Filed: Apr. 1, 1991

[51] Int. Cl.⁵ .............................................. H01R 13/66
[52] U.S. Cl. ..................................... 439/620; 455/100
[58] Field of Search ............... 439/620, 638, 668, 669; 455/78, 89, 92, 100

[56] References Cited

U.S. PATENT DOCUMENTS

| | | | |
|---|---|---|---|
| 3,536,870 | 10/1970 | Izumi . | |
| 3,944,924 | 3/1976 | Miyachi | 455/89 |
| 4,367,374 | 1/1983 | Serrano . | |
| 4,491,694 | 1/1985 | Harmeyer . | |
| 4,549,309 | 10/1985 | Corrigan | 455/78 |
| 4,636,016 | 1/1987 | Ford . | |
| 4,688,262 | 8/1987 | Schaefer | 455/89 |
| 4,803,728 | 2/1989 | Lueken | 439/669 X |

OTHER PUBLICATIONS

Motorola Catalog Sheet-RO-04-08C (P. A.7).

*Primary Examiner*—Eugene F. Desmond
*Attorney, Agent, or Firm*—Juliana Agon

[57] ABSTRACT

A simplex radio-accessories interface connector (30) connects the simplex radio (10) having a speaker amplifier (102) and a push-to-talk (PTT) detector (103) to accessories which include an earpiece speaker (107) and a PTT switch (110). The connector (30) has a first connector mating assembly (25a-d and 84a-d) for coupling the connector (30) to the radio (10) and a second connector mating assembly (44a-c and 48a-c) for coupling the connector (30) to the accessories. Inside the connector (30), a receive audio line (104a) couples the speaker amplifier (102) to the earpiece speaker (107) and a PTT detect line (122) couples the PTT detector (103) to the PTT switch (110). At the second connector mating assembly (44a-c and 48a-c), the receive audio (104a) and the PTT detect (122) lines are combined (44a and 48a).

9 Claims, 4 Drawing Sheets

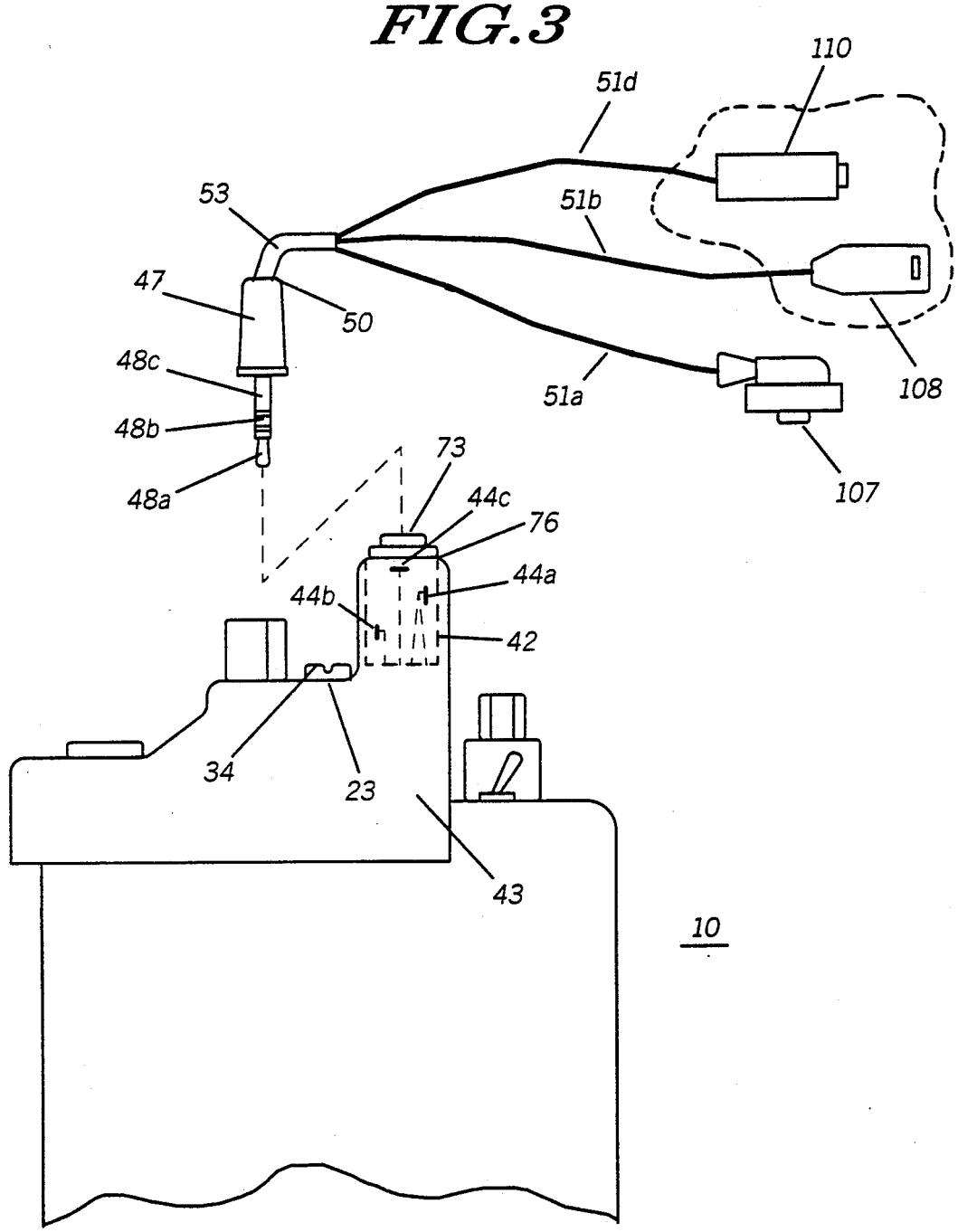

MINIMUM WIRE INTERFACE FOR MULTIPLE ACCESSORIES

TECHNICAL FIELD

This invention relates generally to electrical connectors and particularly to electrical connectors having a plurality of electrical contacts for engagement with flush contacts.

BACKGROUND

There are numerous connector arrangements for providing multiple contact connections. Such multi-pin connectors have been used on the top or on the sides of portable two-way radios for the connection of microphones and other accessory items.

It is desirable to use sealed flush contacts on such devices as radios since such contacts not only inhibit the intrusion of foreign substance such as water and dust, but also provide smooth, clean, exterior surfaces. In the past, such multiple contacts mated with multiple contact connectors which generally required a fairly bulky connector accessory plug in order to provide for the interconnection of multi-conductor cables of accessories with the electrical contacts of the accessory connector adapter. Not only are these connectors bulky, comprising either an integral or separate plug and adapter, but they are also costly.

The prior art connectors are large and costly, because multiple one-to-one wire paths were involved even for a simplex portable radio. Usually, each of three common accessories, an ear piece speaker, a microphone, and a Push-to-Talk (PTT) switch (the PTT switch may be made integral with the microphone), have two wires, an active wire and a ground wire. Conventionally, when all the ground wires are connected together in one common path, there would still be four total paths, since the active wires of the speaker, microphone and PTT switch were not shared.

Since there is a trend to design future radios to be small, there is also a need to design for and/or standardize such accessory connectors (accessory radio connection adapters and plugs) to one that is both small and inexpensive.

SUMMARY OF THE INVENTION

Accordingly, the present invention provides an accessory connector and adapter that overcomes the detriments of the prior art. A smaller and more economical connector such as the common personal entertainment headset connector, mini stereo phone plug or mini audio plug, (which is 3.5 millimeters in diameter) is utilized as a plug with a corresponding audio jack connector adapter by using less wire paths. Minimum paths were achieved by sharing a common path in the simplex radio which can only be in one of three modes at a time (standby, receive or transmit). The present invention thus utilizes the simplex conditions by combining the signal paths for receive audio and PTT (for transmitting) onto one common path.

Briefly, according to the invention, a simplex radio-accessories interface connector connects the simplex radio having a speaker amplifier and a push-to-talk (PTT) detector to accessories which include an earpiece speaker and a PTT switch. The connector has a first connector mating assembly for coupling the connector to the radio and a second connector mating assembly for coupling the connector to the accessories. Inside the connector, a receive audio line couples the speaker amplifier to the earpiece speaker and a PTT detect line couples the PTT detector to the PTT switch. At the second connector mating assembly, the receive audio and the PTT detect lines are combined.

Brief Description of the Drawings

FIG. 3 is a fragmentary elevation view of the radio and connector of FIG. 2 with accessories attached to the audio plug.

Detailed Description of the Preferred Embodiment

Figure 1:
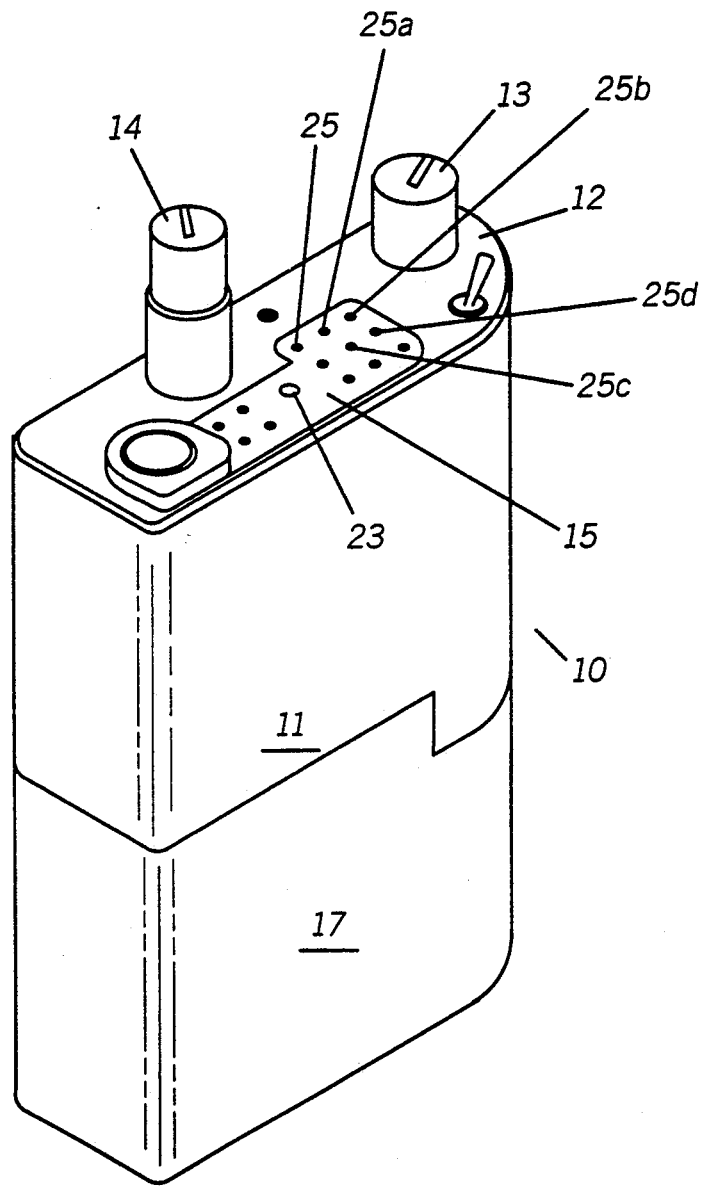
FIG. 1 is a perspective view of a portable simplex radio having flush accessory contacts.

Referring to FIG. 1, it will be understood that a portable simplex radio indicated generally as 10 can utilize a connector of this invention. The radio 10 includes a body 11 to which a battery portion 17 is detachably connected. The body 11 includes a top 12 which carries volume and channel knobs 13 and 14. The top 12 includes a slightly raised pedestal portion 15 for receiving a plurality of contacts 25 and contains a threaded insert 23 provided for connector fastening purposes.

The plurality of electrical contacts or universal contacts 25, which in this case constitute nine contacts laid out in a grid fashion are located on the top of the radio housing 11. It will be understood that the contacts 25 are substantially flushed with the top of the radio housing 11 and lie substantially in the same plane as the top of the radio 10. However, it will be understood that the present invention could also apply if the contacts were elsewhere on the radio 10 (i.e. on the side, or the back of the radio, etc.) These contacts 25 are used for accessory connections for the radio 10 and/or test points for use in manufacturing assembly and testing of the radio. For example, radio contact 25a is the contact point that provides access to the output of the speaker amplifier 102 for a radio speaker. The circuit diagram for the radio and accessory connections are more clearly seen in FIG. 5. Similarly, contacts 25b, 25d, and 25c are the radio contacts that provide access to the input of the microphone amplifier 106 for the radio microphone, the input of the radio's push-to-talk (PTT) detector 103, and ground, respectively. When the connector 30 is connected to the radio 10, as can be seen in FIGS. 1 and 3-5, such contacts 25a-d and pins 84a-d are used to carry the audio to drive a remote earpiece speaker 107 and provide connections for a remote microphone 108 and for a remote PTT switch 110.

Figure 2:
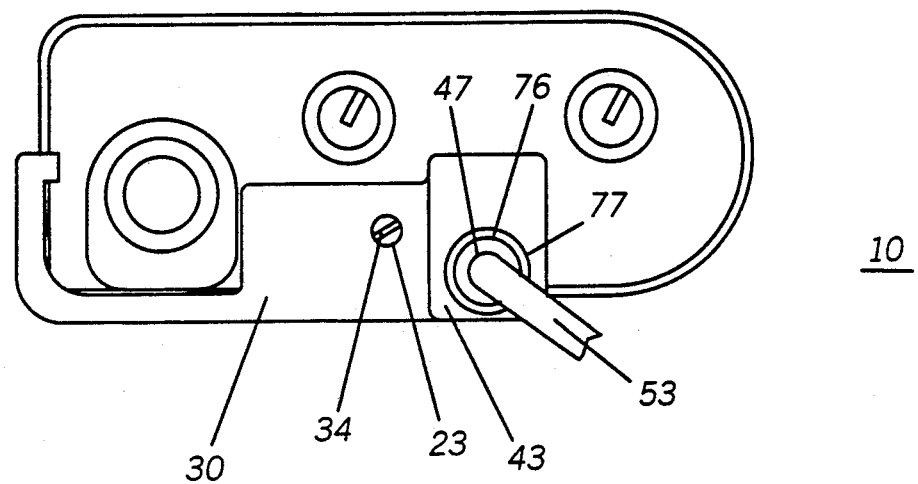
FIG. 2 is a top plan view of the radio of FIG. 1 with a connector comprising an adaptor housing and an audio plug attached.

In FIG. 2, the radio 10 is shown with a connector 30 attached thereto. The connector 30 will be discussed in further detail in reference to FIGS. 3 and 4.

Referring to FIGS. 2 and 3, it will be appreciated that the connector 30 includes an adaptor housing or contact carrying portion 43 and an accessory connector plug 47 detachably attached to the top of the adaptor housing 43. The accessory connector is small and economical and is preferably implemented using the common personal entertainment headset connector, mini stereo phone plug, or mini audio plug which is only 3.5 millimeters in diameter. A threaded screw 34 is provided on the adaptor housing 43. It will be understood that when attaching the adapter housing 43 to the radio 10, the adapter housing 43 is pushed against the top of the radio 10 and is fastened by threading the screw 34 into the threaded insert 23 of the radio 10 in order to mechanically mount the adapter housing 43.

Referring back to FIGS. 3 and 5, three cables 51a, 51b, and 51d which are supported by a flex relief rubber member 53 can be seen entering the audio plug or accessory mini audio plug 47 as through a top portion 50. These cables 51a, 51b, 51d connect the ear piece speaker 107, the microphone 108, and the Push-to-Talk (PTT) switch 110, respectively, (the PTT switch may be made integral with the microphone to be connected by one cable having two active and ground wires) to the plug 47, and each cable 51 have two wires, an active wire 104a, 122, or 104b and a ground wire 104c, 122c, or 116.

As is common, the mini audio plug 47 has an insulated ring section 48b separating a sleeve section 48c and a tip section 48a. It will be appreciated that electrical connections between the cables 51 and the three different sections of the audio plug 47 can be made or soldered within the audio plug 47. The sleeve section 48c connects to the ground wires 104c, 122c, and 116 of the earpiece speaker 107, PTT switch 110, and microphone 108, respectively. The ring section 48b connects the active wire 104b of the microphone 108. In order for the present invention to work for a simplex radio, the active wire 104a of the earpiece speaker 107 connects to the negative end of a capacitor 118, whose positive end is connected to the tip section 48a. The active wire 122 of the PTT switch 110 also connects to the positive end of the capacitor 118 and to the tip section 48a. It is to be appreciated that the connections to the tip 48a and ring 48b sections can be interchanged as long as there is a shared path on one of the sections.

Referring to FIGS. 2 and 3, the adaptor assembly 43 and associated housing is shown in greater detail. The adaptor housing 43 includes a common audio plug receptacle or phono jack 42 for receiving the accessory connector plug or audio plug 47 for forming the second connector means for coupling the connector to the accessories. At the top of the adaptor assembly 43, the conventional audio jack or receptacle 42 residing within has a threaded insert input means 73 protruding from an aperture 76 of the adaptor housing 43. The aperture 76 maybe a plated through hole that is surrounded on the surface by a grounding pad 77. As part of the conventional audio jack which is within the adaptor housing 43 are three contact points, a receive audio and PTT jack contact 44a, a ground jack contact 44c, and a microphone jack contact 44b. Hence, the microphone and speaker/PTT audio jack contacts 44b and 44a provide connections for the ring 48b and tip 48a sections of the audio plug 47, respectively, while the sleeve section 48c can be connected directly to the threaded insert 76 of the audio jack 42 which is also grounded to the audio jack ground contact 44c as the audio plug 47 is inserted into the audio jack 42.

Figure 4:
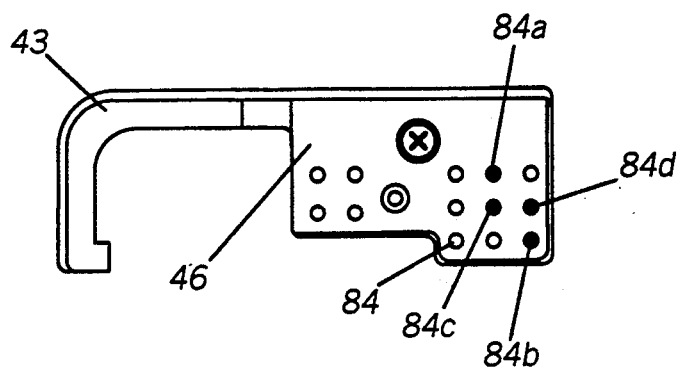
FIG. 4 is a bottom view of the adaptor housing of FIGS. 2 and 3.
Figure 5:
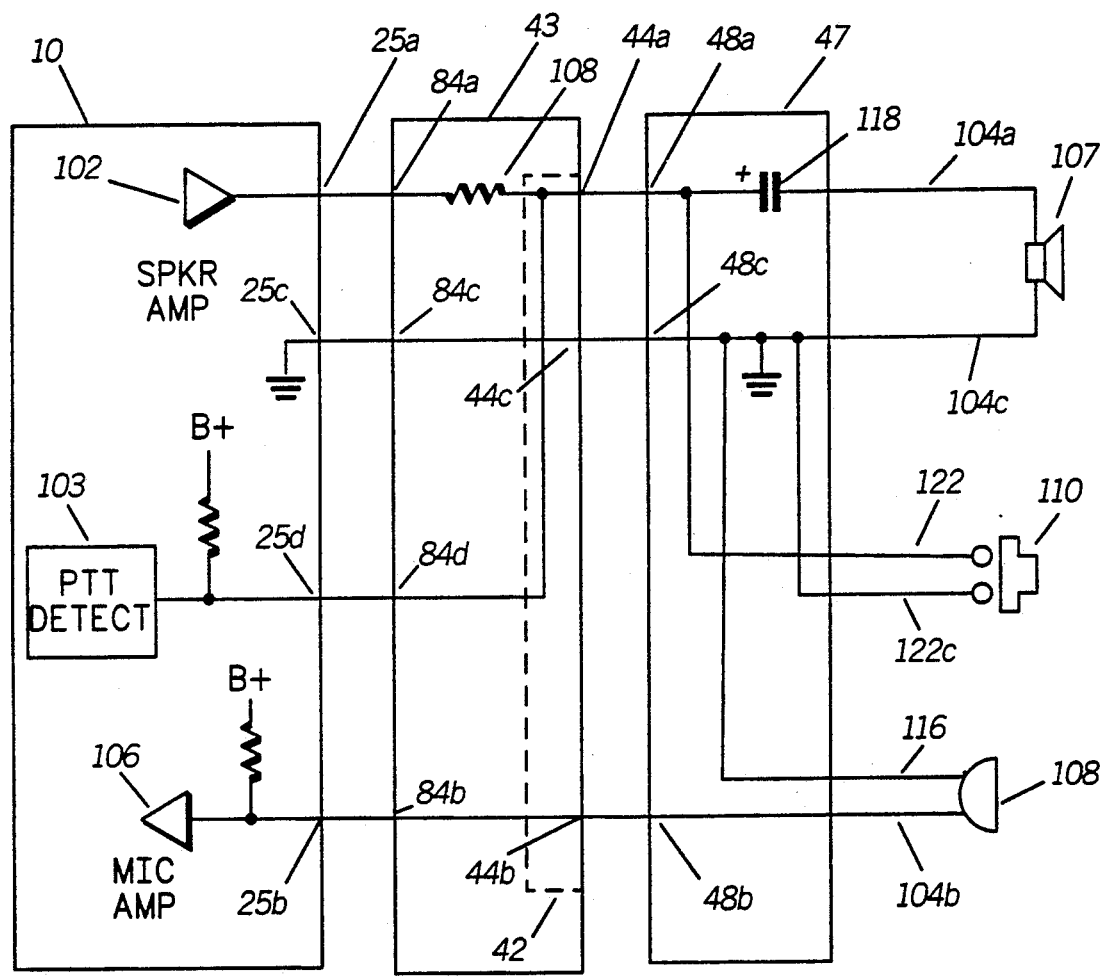
FIG. 5 is a circuit diagram of the connector connecting the radio and accessories of FIG. 3

Referring to FIG. 4, the bottom of the adaptor housing 43 is shown. For communication with the flush contacts 25, specifically 25a–d, the contact carrying portion of adaptor housing 43 includes a recess 46 which is contoured to receive a multi-contact pin assembly 84 including a received audio contact pin 84a, a PTT detect contact pin 84d, a ground pin 84c, and a microphone amplifier contact pin 84b. Also within the adaptor housing 43, a resistor 108 forms a speaker attenuator and delivers the received audio 104a from the contact pin 84a which projects above the bottom plane surface or recess 46 of the adaptor housing 43 to the received audio and PTT jack contact 44a as seen in FIG. 5. The receive audio and PTT jack contact 44a is also connected to the PTT detect contact pin 84d of the pin assembly 84. Pin 84c is connected to the ground jack contact 44c, the threaded insert 76, and the surrounding ground pad 77. Similarly, the microphone amplifier contact pin 84b is connected to the microphone audio jack contact 44b.

In use, when the connector 30 comprising the adaptor housing 43 and the audio plug 47 is attached to the device such as the radio 10, the contact pins 84a through 84d engage with or mate with their respective radio contacts 25a through 25d on the radio 10 and forms a first connector means for coupling the connector 30 to the radio 10.

Referring to FIG. 5, a circuit diagram for the accessory connections to a simplex radio is illustrated. By definition, the simplex radio 10 can be in only one of three modes at a time. The three modes are standby, receive, or transmit. With the radio 10 in the standby mode, the speaker amplifier output 102 of the radio 10 presents no AC signal to the accessory plug 47. Hence, there is correspondingly no audio output at the earpiece speaker 107. In addition, no radio PTT signal on the active wire 122 will be activated by the PTT switch 110.

With the radio 10 in the receive mode, the speaker output 102 of the radio 10 receives an AC message voltage. The voltage applied to the accessory connector and plug causes an earpiece speaker output on the audio active line 104a at the earpiece speaker 107 for the reception of the received message. The audio signal is attenuated by the speaker attenuator resistor 108 and is coupled to the earpiece speaker 107 on the audio active line 104a by the coupling capacitor 118. The coupling capacitor 118 also blocks DC voltages such that zero volt potential at the speaker ground side 104c is isolated from the input of the PTT detector 103 while DC voltages on the PTT active wire 122 will also be blocked from the earpiece speaker 107. Meanwhile, no radio PTT signal will be detected by the PTT detector 103 on the active wire 122.

As desired, the radio 10 is changed to the transmit mode by a user. The accessory PTT switch 110 is pressed by the user to ground the active and ground wires 122 and 122c, respectively, which causes the speaker attenuator resistor 108 output at the receive audio and PTT jack contact 44a to be at zero DC voltage level. This DC zero voltage signal is wired or coupled from the adaptor 43 to the radio PTT detector input 103 and interrupts any in process receive message for the radio 10 to revert to the transmit mode. Only in the transmit mode will the radio microphone amplifier 106 become active for the accessory microphone 108 output to be processed as a transmit message.

In summary, the signal paths for received audio and push-to-talk for transmit are combined onto one wiring path since a simplex radio can only receive or transmit at a time. Consequently, since multiple dedicated wire paths in a bulky cable are now shared according to the invention, the prior art bulky and costly accessory plug can now be reduced in size and cost.

What is claimed is:

1. A simplex radio-accessories interface connector for interfacing a simplex radio and a plurality of accessories, said simplex radio having speaker amplification means and a push-to-talk (PTT) detector, said plurality of accessories including an earpiece speaker and a PTT switch, said connector comprising:
   first connector means for coupling said connector to said radio;
   second connector means for coupling said connector to said accessories;
   a receive audio line for coupling said speaker amplification means to said earpiece speaker;
   a PTT detect line for coupling said PTT detector to said PTT switch; and
   combining means for combining said receive audio line and said PTT detect line at said second connector means.

2. The simplex radio-accessories interface connector of claim 1 wherein said second connector means comprises an audio jack receiving an audio plug.

3. The simplex radio-accessories interface connector of claim 2 wherein said audio plug includes a conductive section for combining said receive audio line and said PTT detect line.

4. The simplex radio-accessories interface connector of claim 2 wherein said audio jack includes a receiving contact from which said receive audio line is separated from said PTT detect line.

5. The simplex radio-accessories interface connector of claim 3 wherein said audio plug includes a series capacitor connected to said conductive section and in between said receive audio line for electrically isolating said receive audio line from said PTT detect line.

6. A connector for the connection of accessories to a simplex radio, said accessories including an earpiece speaker and a press-to-talk (PTT) switch, operation of said PTT switch causes said simplex radio to change from a receiving mode into an alternative transmitting mode, said plug comprising:
   a conductive section having a shared wire path for alternating operation of said simplex radio in between said receiving and transmitting modes;
   a first wiring means for connecting said earpiece speaker to said conductive section for providing an earpiece speaker output at said earpiece speaker in said receiving mode; and
   a second wiring means for connecting said PTT switch to said conductive section, operation of said PTT switch, alternatively, discontinues said earpiece speaker output at said earpiece speaker in said transmitting mode.

7. An accessories plug for the connection of accessories including an earpiece speaker and a PTT switch to a device, said plug comprising:
   a conductive section for operation of said device;
   a first wiring means for connecting said earpiece speaker to said conductive section, wherein said first wiring means includes an in-series capacitor to electrically isolate said earpiece speaker from said PTT switch; and
   a second wiring means for connecting said PTT switch to said conductive section.

8. A simplex radio-accessories interface connector assembly for interfacing a simplex radio and a plurality of accessories, said simplex radio having speaker amplification means, microphone amplification means, a radio ground, and a push-to-talk (PPT) detector, said plurality of accessories including an earpiece speaker, a microphone, and a PTT switch, said plurality of accessories each having a ground wire and an active wire, said connector assembly comprising:
   a capacitor having a negative side and being attached to said active wire of said earpiece speaker;
   a miniature audio plug having three sections:
      a first section connects to said positive side of said capacitor and to the active wire of the PTT switch to form a receive audio and PTT accessory connection;
      a second section connects to the microphone active wire to form a microphone accessory connection;
      a third section connects to said ground wires of said earpiece speaker, microphone, and switch to form a ground accessory connection;
   an adaptor including a miniature audio jack for receiving said audio plug to provide more radio connections than accessory connections;
   a first adapter radio connection connects said speaker amplification means to said receive audio and PTT accessory connection;
   a second adapter radio connection connects said PTT detector to said receive audio and PTT accessory connection;
   a third adapter radio connection connects said microphone amplification means to said microphone accessory connection; and
   a fourth adapter radio connection connects said radio ground to said ground accessory connection.

9. The simplex radio-accessories interface connector assembly of claim 8 wherein:
   said first section of said audio plug comprises a tip section;
   said second section comprises a ring section; and
   said third section comprises a sleeve section.

* * * * *